(12) United States Patent
Xian et al.

(10) Patent No.: US 11,663,991 B2
(45) Date of Patent: May 30, 2023

(54) DISPLAY SCREEN DISPLAY PARAMETER ADJUSTMENT METHOD AND DEVICE, AND COMPUTER-READABLE STORAGE MEDIUM

(71) Applicant: Lenovo (Beijing) Limited, Beijing (CN)

(72) Inventors: Dayang Xian, Beijing (CN); Zhijian Mo, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 17/682,870

(22) Filed: Feb. 28, 2022

(65) Prior Publication Data

US 2023/0098278 A1    Mar. 30, 2023

(30) Foreign Application Priority Data

Sep. 27, 2021   (CN) .......................... 202111133329.1

(51) Int. Cl.
*G09G 5/10*   (2006.01)
*G06F 3/14*   (2006.01)

(52) U.S. Cl.
CPC .............. *G09G 5/10* (2013.01); *G06F 3/1423* (2013.01); *G09G 2320/0686* (2013.01); *G09G 2320/08* (2013.01)

(58) Field of Classification Search
CPC ........ G06F 3/14; G06F 3/1423; G06F 3/1446; G06F 3/1454; G06F 3/1462; G06F 3/147
See application file for complete search history.

(56) References Cited

U.S. PATENT DOCUMENTS

| | | | | |
|---|---|---|---|---|
| 8,803,922 B2* | 8/2014 | Marcu | .......................... | G09G 5/12 348/674 |
| 9,093,012 B2* | 7/2015 | Ma | .......................... | G09G 3/003 |
| 9,613,397 B2* | 4/2017 | Zhao | .......................... | G09G 5/10 |
| 9,728,163 B2* | 8/2017 | Ma | .......................... | G09G 3/36 |
| 10,510,305 B2* | 12/2019 | Files | .......................... | G06F 3/1423 |
| 10,585,637 B2* | 3/2020 | Xu | .......................... | G06F 3/1462 |
| 10,950,170 B2* | 3/2021 | Li | .......................... | G09G 3/3233 |
| 10,950,201 B2* | 3/2021 | Wang | .......................... | G06V 40/12 |
| 11,037,528 B2* | 6/2021 | Zhang | .......................... | H04M 1/725 |
| 2008/0049034 A1* | 2/2008 | Chin | .......................... | G06F 3/1438 345/535 |
| 2008/0297451 A1* | 12/2008 | Marcu | .......................... | G09G 3/3611 345/77 |
| 2013/0222308 A1* | 8/2013 | Ma | .......................... | G09G 5/003 345/697 |

(Continued)

*Primary Examiner* — Patrick F Marinelli

(74) *Attorney, Agent, or Firm* — Anova Law Group, PLLC

(57) ABSTRACT

A display screen display parameter adjustment method. The method includes obtaining a trigger event of display parameters of a display screen, the display screen including a first display area and a second display area; if the trigger event satisfies a preset condition, determining that an adjustment mode of the display parameters of the display screen is a synchronous mode, and simultaneously adjusting the display parameters of the first display area and the second display area; and if the trigger event does not satisfy the preset condition, determining that the adjustment mode of the display parameters of the display screen is an asynchronous mode, and adjust the display parameters of the first display area and the second display area respectively.

20 Claims, 6 Drawing Sheets

(56) References Cited

U.S. PATENT DOCUMENTS

| | | | |
|---|---|---|---|
| 2014/0240202 A1* | 8/2014 | Zhao | G06F 3/1446 345/1.3 |
| 2014/0333684 A1* | 11/2014 | Marcu | G09G 3/3611 345/77 |
| 2015/0269709 A1* | 9/2015 | Zhao | G06T 3/4092 345/589 |
| 2015/0287387 A1* | 10/2015 | Ma | G06F 3/04847 345/697 |
| 2016/0165229 A1* | 6/2016 | Kao | H04N 9/12 348/189 |
| 2018/0275948 A1* | 9/2018 | Xu | G06F 3/1454 |
| 2019/0108794 A1* | 4/2019 | Files | G09G 3/342 |
| 2019/0371252 A1* | 12/2019 | Liu | G09G 3/3426 |
| 2020/0227005 A1* | 7/2020 | Zhang | H04M 1/725 |
| 2020/0234634 A1* | 7/2020 | Li | G09G 3/3208 |
| 2020/0273427 A1* | 8/2020 | Wang | G06F 21/32 |
| 2021/0193067 A1* | 6/2021 | Shao | G09G 3/3685 |
| 2022/0101811 A1* | 3/2022 | Liu | G09G 5/10 |
| 2022/0157274 A1* | 5/2022 | Liu | G09G 5/003 |
| 2022/0208053 A1* | 6/2022 | Wu | G09G 5/10 |

\* cited by examiner

DISPLAY SCREEN DISPLAY PARAMETER ADJUSTMENT METHOD AND DEVICE, AND COMPUTER-READABLE STORAGE MEDIUM

CROSS-REFERENCES TO RELATED APPLICATION

This application claims priority to Chinese Patent Application No. 202111133329.1 filed on Sep. 27, 2021, the entire content of which is incorporated herein by reference.

FIELD OF TECHNOLOGY

The present disclosure relates to the field of communication technology and, more specifically, to a display screen display parameter adjustment method and device, a computer-readable storage medium.

BACKGROUND

In order to meet the user's demand for notebook displays, more and more computers have a dual-screen design. At present, none of the operating systems provided by Microsoft have the function of adjusting the brightness of dual screens. For example, in Widows 10 or Windows 11, the brightness of s specific display screen is adjusted by a brightness adjustment bar of the computer's built-in screen.

At present, although the ASUS Zenbook series has a dual-screen design, and provides the function of dual-screen brightness adjustment, such as adjusting the brightness of the second display area of the ASUS Zenbook through the pulse width modulation method. However, there is still a difference in brightness between the adjusted second display area and the first display area, such that the first display area and the second display area cannot achieve effective cooperation. As a result, the user will have visual fatigue during the use of the dual-screen display, which in turn impairs the user's experience with the dual-screen display.

BRIEF SUMMARY OF THE DISCLOSURE

One aspect of the present disclosure provides a display screen display parameter adjustment method. The method includes obtaining a trigger event of display parameters of a display screen, the display screen including a first display area and a second display area; if the trigger event satisfies a preset condition, determining that an adjustment mode of the display parameters of the display screen is a synchronous mode, and simultaneously adjusting the display parameters of the first display area and the second display area; and if the trigger event does not satisfy the preset condition, determining that the adjustment mode of the display parameters of the display screen is an asynchronous mode, and adjust the display parameters of the first display area and the second display area respectively.

Another aspect of the present disclosure provides a display screen display parameter adjustment device. The device includes an acquisition module configured to obtain a trigger event of display parameters of the display screen, the display screen including a first display area and a second display area; a synchronous module configured to determine that an adjustment mode of the display parameters of the display screen is a synchronous mode, and simultaneously adjust the display parameters of the first display area and the second display area if the trigger event satisfies a preset condition; and an asynchronous module configured to determine that the adjustment mode of the display parameters of the display screen is an asynchronous mode, and adjust the display parameters of the first display area and the second display area respectively if the trigger event does not satisfy the preset condition.

Another aspect of the present disclosure provides a non-transitory computer-readable storage medium containing computer-executable instructions for, when executed by one or more processors, performing a display screen display parameter adjustment method. The method includes obtaining a trigger event of display parameters of a display screen, the display screen including a first display area and a second display area; if the trigger event satisfies a preset condition, determining that an adjustment mode of the display parameters of the display screen is a synchronous mode, and simultaneously adjusting the display parameters of the first display area and the second display area; and if the trigger event does not satisfy the preset condition, determining that the adjustment mode of the display parameters of the display screen is an asynchronous mode, and adjust the display parameters of the first display area and the second display area respectively.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
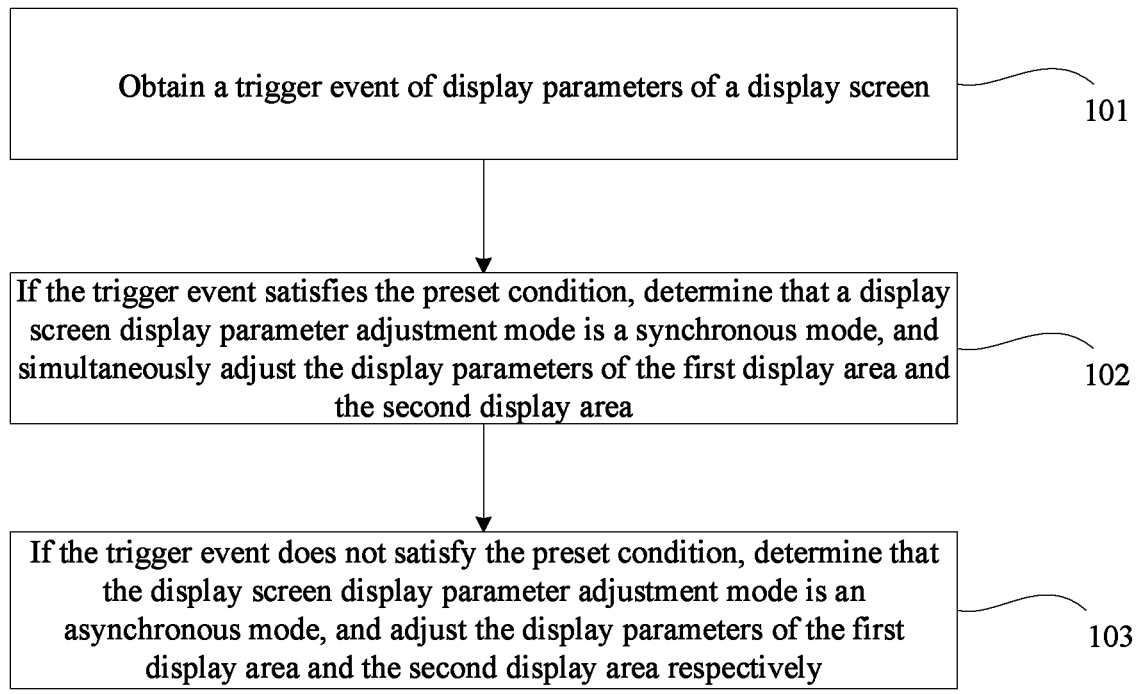
FIG. 1 is a flowchart of a display screen display parameter adjustment method according to an embodiment of the present disclosure.

FIG. 1 is a flowchart of a display screen display parameter adjustment method according to an embodiment of the present disclosure. The display screen may include a first display area and a second display area. The method will be described in detail below.

101, obtaining a trigger event of display parameters of a display screen.

102, if the trigger event satisfies the preset condition, determining that a display screen display parameter adjustment mode is a synchronous mode, and simultaneously adjusting the display parameters of the first display area and the second display area.

103, if the trigger event does not satisfy the preset condition, determining that the display screen display parameter adjustment mode is an asynchronous mode, and adjusting the display parameters of the first display area and the second display area respectively.

There are many methods for obtaining the trigger event. In some embodiments, the trigger event may be obtained by manual triggering, such as triggering a keyboard hotkey, triggering the display parameters setting of the operating system, triggering the parameter adjustment interface of an APP, ALS ambient light detection, etc. The triggering of the parameter adjustment interface may include obtaining a trigger operation to adjust the display parameters of the display screen, and generating a parameter adjustment interface, the parameter adjustment interface including an adjustment mode option; and obtaining the trigger event based on a selection of the adjustment mode option.

In some embodiments, the trigger event may also be obtained by automatic triggering through a trigger instruction generated by the system. For example, a detection may be performed on the displayed objects in the first display area and the second display area, and the trigger instruction may be generated based on the detection result for automatic triggering, thereby obtaining the trigger event of the display parameters of the display screen. In other embodiments, the trigger event may also be obtained through automatic triggering by a system time. Therefore, based on the different acquisition methods of the trigger event, the display parameters of the display screen may be adjusted manually or automatically, thereby improving the user experience in different scenarios.

It should be noted that the first display area and/or the second display area may refer to a specific flexible screen or a projection area, which is not limited in the embodiments of the present disclosure.

In the embodiments of the present disclosure, the display parameters may be one or more of the brightness, saturation, sharpness, etc. of the display screen.

In the processes at 102 and 103, the preset condition may be for the trigger event. Due to the different acquisition methods of the trigger event, each trigger event may have a corresponding preset condition. For example, when the trigger event of the display parameters of the display screen is obtained based on the adjustment mode option in the parameter adjustment interface of an APP, the corresponding preset condition may be a selection of the trigger adjustment mode option. If the trigger adjustment mode option is selected, it may indicate that the trigger event satisfies the preset condition, and the adjustment mode may be determined as the synchronous mode. If there is no selection of the trigger adjustment mode option, it may indicate that the trigger event does not satisfy the preset condition, and the adjustment mode may be determined as the asynchronous mode. In another example, when the trigger event of the display parameters of the display screen is obtained based on the current system time, the corresponding preset condition may be the current system time equal to a preset time. If the current system time is equal to the preset time, it may indicate that the trigger event satisfies the preset condition, and the adjustment mode may be determined as the synchronous mode. If the current system time is less than the preset time, it may indicate that the trigger event does not satisfy the preset condition, and the adjustment mode may be determined as the asynchronous mode.

In the synchronous mode, the adjustment of the display parameters for the first display area and second display area may include notifying a graphics card that the current adjustment mode is the synchronous mode. Subsequently, the graphics card may obtain the display parameters of the first display area from the operating system, and adjust the display parameters of the second display area based on the display parameters of the first display area. In this way, the second display area may have the same display parameters as the first display area, such that the first display area and the second display area can be adjusted synchronously.

In the asynchronous mode, the adjustment of the display parameters for the first display area and second display area may include notifying the graphics card that the current adjustment mode is the asynchronous mode. Subsequently, the graphics card may adjust the display parameters of the first display area and the second display area respectively, thereby realizing the asynchronous adjustment of the first display area and the second display area.

It should be noted that there may be two independent API interfaces. One API interface may be used to notify the graphics card whether the current adjustment mode is synchronous or asynchronous, and the other API interface may be used to adjust the display parameters of the first display area and the second display area synchronously or asynchronously.

The adjustment of the display parameters of the first display area and the second display area by the graphics card may be realized through the backlight auxiliary modulation technology, or through the pulse width modulation technology, which is not limited in the embodiments of the present disclosure.

Consistent with the present disclosure, by obtaining the trigger event of the display parameters of the display screen, determining the trigger event, determining the adjustment mode of the display parameters of the display screen based on the determination result, and adjusting the display parameters of the first display area and the second display area based on the adjustment mode, synchronous and asynchronous adjustment of the first display area and the second display area of the display screen can be realized. As a result, user's visual fatigue due to different display parameters of the first display area and the second display area can be relieved, thereby improving the user's experience of the display screen in different scenarios.

Figure 2:
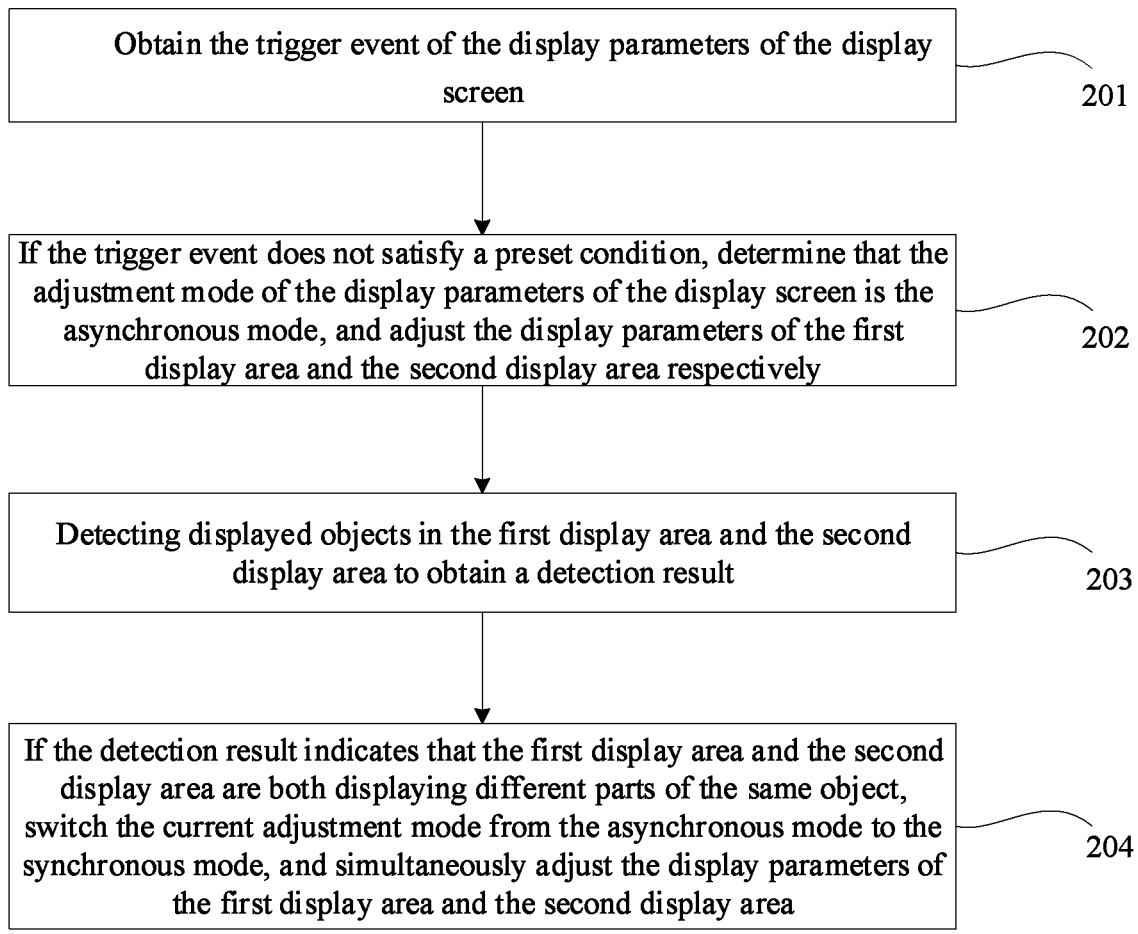
FIG. 2 is a flowchart of the display screen display parameter adjustment method according to an embodiment of the present disclosure.

FIG. 2 is a flowchart of the display screen display parameter adjustment method according to an embodiment of the present disclosure. This embodiment can be obtained based on the previous embodiment. The display screen may include a first display area and a second display area. The method will be described in detail below.

201, obtaining a trigger event of the display parameters of a display screen.

202, if the trigger event does not satisfy a preset condition, determining that the adjustment mode of the display parameters of the display screen is the asynchronous mode, and adjusting the display parameters of the first display area and the second display area respectively.

203, detecting the displayed objects in the first display area and the second display area to obtain a detection result.

204, if the detection result indicates that the first display area and the second display area are both displaying different parts of the same object, switching the current adjustment mode from the asynchronous mode to the synchronous mode, and simultaneously adjusting the display parameters of the first display area and the second display area.

The implementations of the processes of 201 and 202 are similar to the implementations of the processes of 101 and 103 in the embodiment shown in FIG. 1, and details will not be repeated here.

More specifically, the displayed objects in the first display area and the second display area in the asynchronous mode may be detected at a preset time. If the detection result indicates that the displayed content of the second display area is a continuation of the displayed content of the first display area (that is, the display mode adopted by the first display area and the second display area is a split-screen display), or if the second display area is for the display of a certain part of the displayed content in the first display area (that is, the display mode adopted by the first display area and the second display area is a drawing board mode), it may indicate that both the first display area and the second display area are displaying different parts of the same object. At this time, the current adjustment mode may be switched from the asynchronous mode to the synchronous mode, and the display parameters of the first display area and the second display area may be adjusted at the same time. If the detection result indicates that the first display area and the second display area are not displaying different parts of the same object, no processing may be performed, and the display screen may continue to display in the asynchronous mode.

It should be noted that the technical solution of this embodiment can be applied to a scenario of browsing a web page, and can also be applied to a scenario of viewing an image.

Consistent with the present disclosure, the displayed objects in the first display area and the second display area in the asynchronous mode can be detected, and the current adjustment mode can be switched from the asynchronous mode to the synchronous mode based on the detection result, thereby synchronously adjusting the display parameters of the first display area and the second display area. In this way, the display parameters of the first display area and the second display area can be adjusted based on the displayed objects to realize automatic adjustment. As a result, user's visual fatigue due to different display parameters of the first display area and the second display area when the user uses a dual-screen laptop to view the same object can be relieved, thereby improving the user experience.

Figure 3:
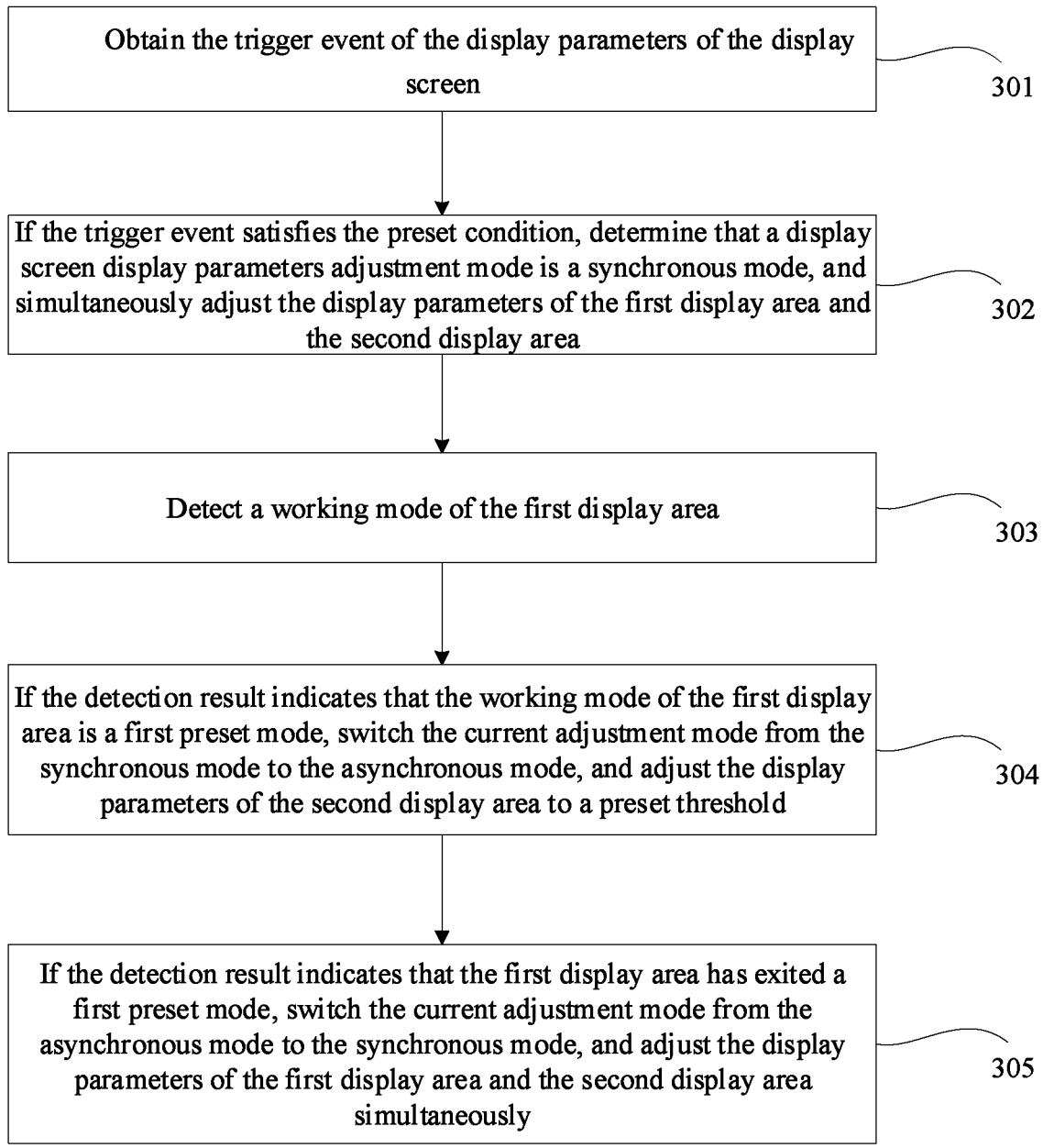
FIG. 3 is a flowchart of the display screen display parameter adjustment method according to an embodiment of the present disclosure.

FIG. 3 is a flowchart of the display screen display parameter adjustment method according to an embodiment of the present disclosure. This embodiment can be obtained based on the foregoing embodiments. The display screen may include a first display area and a second display area. The method will be described in detail below.

301, obtaining a trigger event of the display parameters of a display screen.

302, if the trigger event satisfies the preset condition, determining that a display screen display parameter adjustment mode is a synchronous mode, and simultaneously adjusting the display parameters of the first display area and the second display area.

303, detecting a working mode of the first display area.

304, if the detection result indicates that the working mode of the first display area is a first preset mode, switching the current adjustment mode from the synchronous mode to the asynchronous mode, and adjusting the display parameters of the second display area to a preset threshold.

305, if the detection result indicates that the first display area has exited a first preset mode, switching the current adjustment mode from the asynchronous mode to the synchronous mode, and adjusting the display parameters of the first display area and the second display area simultaneously.

The implementations of the processes of 301 and 302 are similar to the implementations of the processes of 101 and 102 in the embodiment shown in FIG. 1, and details will not be repeated here.

The first preset mode may be artificially set, which is not limited in the embodiments of the present disclosure. The first preset mode may be a full-screen mode, such as for games, videos, etc. The first preset mode may also be a deep office mode, such as document editing, PPT processing, webpage browsing, etc. The first preset mode may also be an automatic entry lock screen or a carousel of wallpapers. For example, the working mode of the first display area may be detected. If the detection result indicates that there is a game running in the first display area and the first display area is in the full-screen mode, the current adjustment mode may be automatically switched from the synchronous mode to the asynchronous mode, and the brightness of the second display area may be reduced to 50% in three minutes, and further reduced to 0% in five minutes. If the detection result indicates that the first display area has exited the full-screen mode, the current adjustment mode may be automatically switched from the asynchronous mode to the synchronous mode.

It should be noted that there may be a corresponding configuration list for the full-screen mode or the deep office mode, such as a configuration list formed by mapping gaming programs and video programs to the full-screen mode.

Consistent with the present disclosure, by detecting the working mode of the first display area in the synchronous mode, switching the current adjustment mode from the synchronous mode to the asynchronous mode based on the detection result, and adjusting the display parameters of the second display area, the display of the display screen can be automatically switched based on the working mode, and the display parameters of the second display area can be effectively adjusted. In this way, the convenience of the use of the display screen by the user in different scenarios can be improved, thereby improving the user experience.

Figure 4:
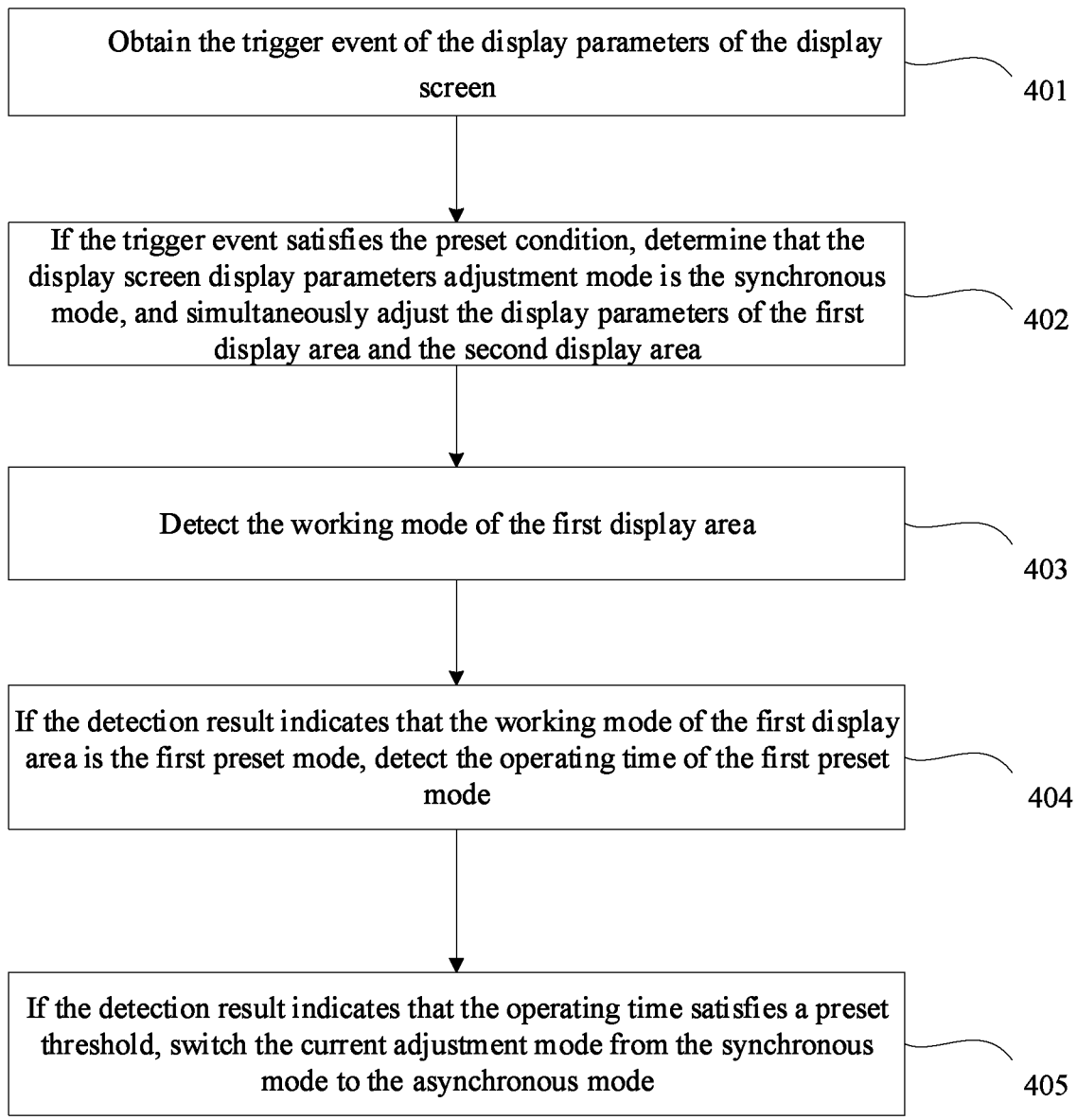
FIG. 4 is a flowchart of the display screen display parameter adjustment method according to an embodiment of the present disclosure.

FIG. 4 is a flowchart of the display screen display parameter adjustment method according to an embodiment of the present disclosure. This embodiment can be obtained based on the foregoing embodiments. The display screen may include a first display area and a second display area. The method will be described in detail below.

401, obtaining a trigger event of the display parameters of a display screen.

402, if the trigger event satisfies the preset condition, determining that the display screen display parameter adjustment mode is the synchronous mode, and simultaneously adjusting the display parameters of the first display area and the second display area.

403, detecting the working mode of the first display area.

404, if the detection result indicates that the working mode of the first display area is the first preset mode, detecting the operating time of the first preset mode.

405, if the detection result indicates that the operating time satisfies a preset threshold, switching the current adjustment mode from the synchronous mode to the asynchronous mode.

The implementations of the processes of 401 and 402 are similar to the implementations of the processes of 101 and 102 in the embodiment shown in FIG. 1, and details will not be repeated here.

In some embodiments, the first preset mode may be a user standby desktop. For example, the working mode of the first display area may be detected, and if the detection result indicates that the first display area is the user standby desktop, the standby time of the user standby desktop may be detected. If the detection result indicates that the standby time is longer than five minutes, the current adjustment mode may be automatically switched from the synchronous mode to the asynchronous mode, and the brightness of the second display area may be reduced to 50% in three minutes and 0% in five minutes.

Figure 5:
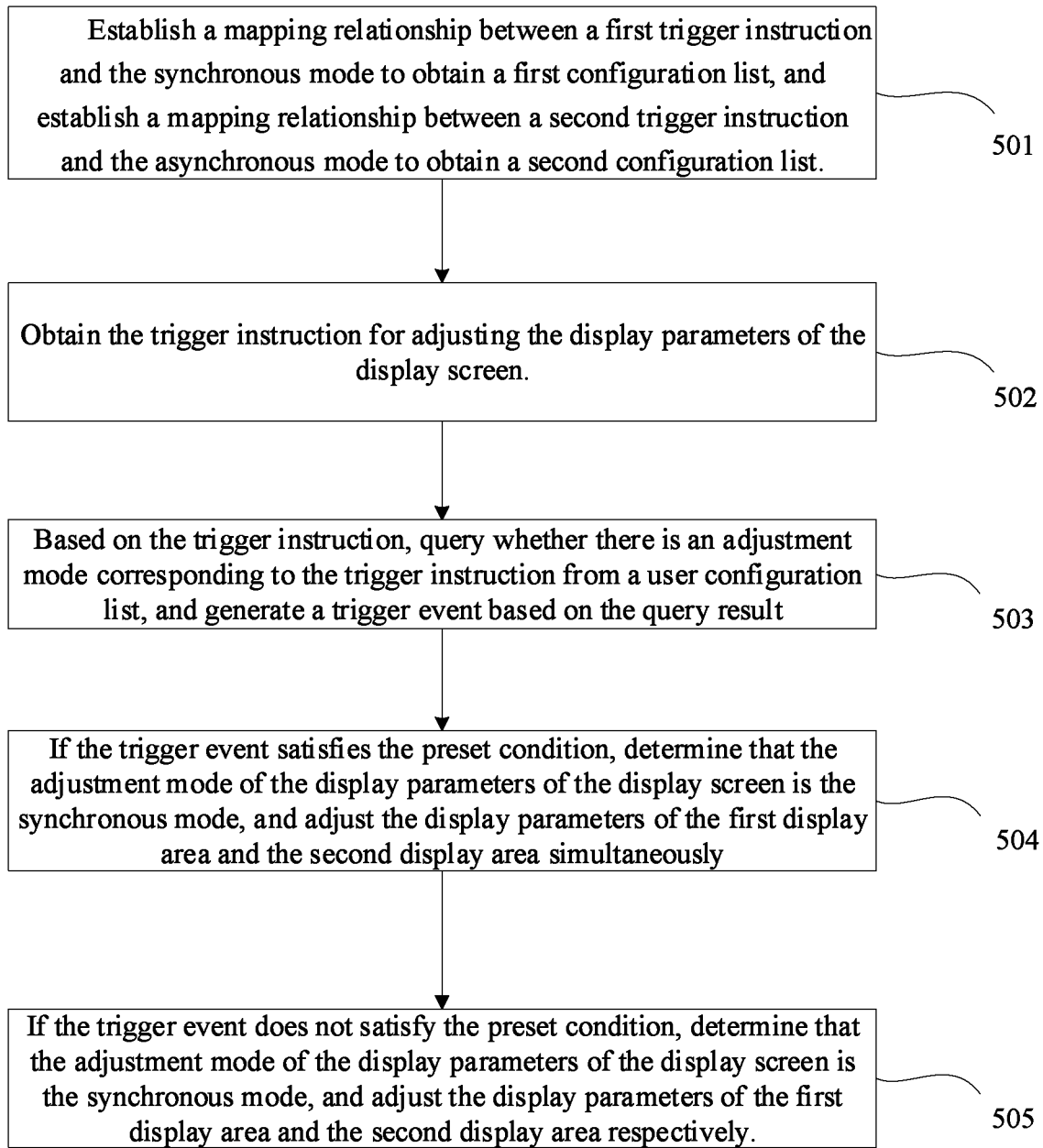
FIG. 5 is a flowchart of obtaining a trigger event of display parameters of a display screen according to an embodiment of the present disclosure.

FIG. 5 is a flowchart of obtaining a trigger event of display parameters of a display screen according to an embodiment of the present disclosure. This embodiment can be obtained based on the foregoing embodiments. The display screen may include a first display area and a second display area. The method will be described in detail below.

501, establishing a mapping relationship between a first trigger instruction and the synchronous mode to obtain a first configuration list, and establishing a mapping relationship between a second trigger instruction and the asynchronous mode to obtain a second configuration list.

502, obtaining a trigger instruction for adjusting the display parameters of the display screen.

503, based on the trigger instruction, querying whether there is an adjustment mode corresponding to the trigger instruction from a user configuration list, and generating a trigger event based on the query result.

504, if the trigger event satisfies the preset condition, determining that the adjustment mode of the display parameters of the display screen is the synchronous mode, and adjusting the display parameters of the first display area and the second display area simultaneously.

505, if the trigger event does not satisfy the preset condition, determining that the adjustment mode of the display parameters of the display screen is the synchronous mode, and adjusting the display parameters of the first display area and the second display area respectively.

The implementations of the processes of 502, 504 and 505 are similar to the implementations of the processes of 101, 102 and 103 in the embodiment shown in FIG. 1, and details will not be repeated here.

In the process at 501, the second trigger instruction may be a trigger instruction generated based on triggering a working mode such as the full-screen display or the deep office display. The first trigger instruction may be a trigger instruction generated based on triggering a display mode such as the split-screen display or the drawing board display, which is not limited in the embodiments of the present disclosure.

Consistent with the present disclosure, by establishing a mapping relationship between different trigger instructions and adjustment modes in advance, and generating the configuration list; and, after obtaining the trigger instruction, querying the corresponding adjustment mode from the configuration list, and adjusting the display parameters of the first display area and the second display area of the display screen based on the adjustment mode, the automatic adjustment can be realized. In this way, the efficiency and accuracy of adjusting the display parameters of the display screen can be improved, thereby improving the user experience.

It should be understood that in various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure.

Figure 6:
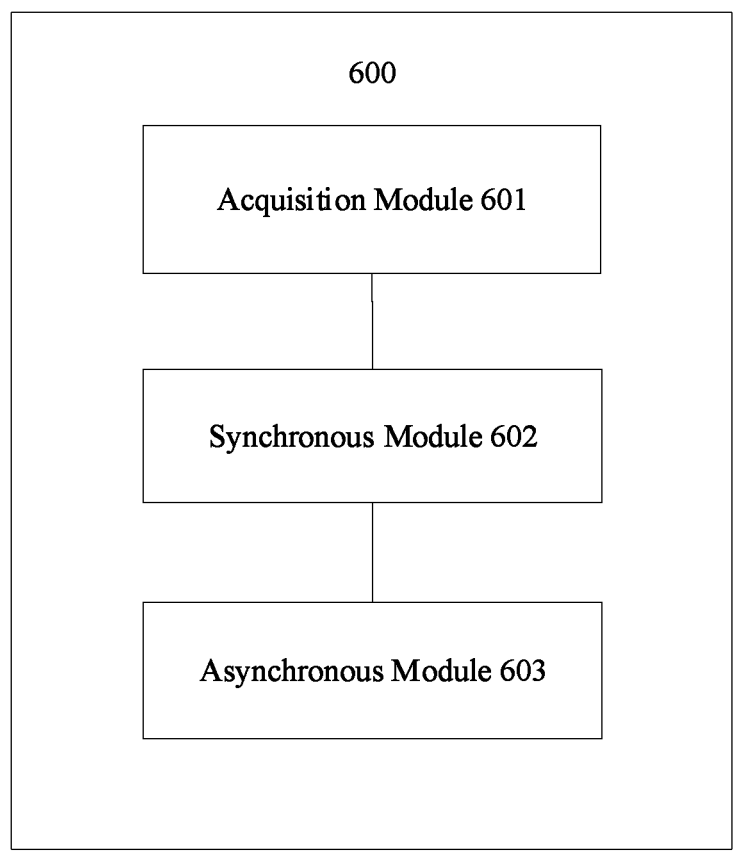
FIG. 6 is a schematic block diagram of a display screen display parameter adjustment device according to an embodiment of the present disclosure.

FIG. 6 is a schematic block diagram of a display screen display parameter adjustment device 600 according to an embodiment of the present disclosure. The display screen may include a first display area and a second display area. As shown in FIG. 6, the display screen display parameter adjustment device 600 includes an acquisition module 601, a synchronous module 602, and asynchronous module 603. The acquisition module 601 may be configured to obtain the trigger event of the display parameters of the display screen. The synchronous module 602 may be configured to determine that the adjustment mode of the display parameters of the display screen is the synchronous mode, and simultaneously adjust the display parameters of the first display area and the second display area if the trigger event satisfies the preset condition. The asynchronous module 603 may be configured to determine that the adjustment mode of the display parameters of the display screen is the asynchronous mode, and adjust the display parameters of the first display area and the second display area respectively if the trigger event does not satisfy the preset condition.

In some embodiments, the display screen display parameter adjustment device 600 may further include a first detection module and a first switching module. The first detection module may be configured to detect the displayed objects in the first display area and the second display area, and obtain a detection result. The first switching module may be configured to switch the current adjustment mode from the asynchronous mode to the synchronous mode, and simultaneously adjust the display parameters of the first display area and the second display area if the detection result indicates that the first display area and the second display area are displaying different parts of the same object.

In some embodiments, the display screen display parameter adjustment device 600 may further include a second detection module, a second switching module, and a third switching module. The second detection module may be configured to detect the working mode of the first display area. The second switching module may be configured to switch the current adjustment mode from the asynchronous mode to the synchronous mode, and adjust the display parameters of the second display area to the preset threshold if the detection result indicates that the working mode of the first display area is the first preset mode. The third detection module may be configured to switch the current adjustment mode from the asynchronous mode to the synchronous mode, and simultaneously adjust the display parameters of the first display area and the second display area if the detection result indicates that the first display area has exited the first preset mode.

In some embodiments, the second switching module may include a detection unit and a switching unit. The detection unit may be configured to detect the operating time of the first preset mode if the detection result indicates that the working mode of the first display area is the first preset mode. The switching unit may be configured to switch the current adjustment mode from the synchronous to the asynchronous mode if the detection result indicates that the operating time satisfies the preset threshold.

In some embodiments, the acquisition module 601 may include an acquisition unit and a generating unit. The acquisition unit may be configured to obtain a trigger operation for adjusting the display parameters of the display screen, and generate a parameter adjustment interface. The parameter adjustment interface may include an adjustment mode option. The generating unit may be configured to generate a trigger event based on a selection of the adjustment mode option.

In some embodiments, the acquisition unit may be further configured to obtain a trigger instruction for adjusting the display parameters of the display screen. The generating unit may be further configured to, based on the trigger instruction, query whether there is an adjustment mode corresponding to the trigger instruction from the user configuration list, and generate a trigger event based on the query result.

In some embodiments, the user configuration list may include a first configuration list and a second configuration list. The display screen display parameter adjustment device 600 may further include a first mapping unit and a second mapping unit. The first mapping unit may be configured to establish a mapping relationship between the first trigger instruction and the synchronous mode to obtain the first configuration list. The second mapping unit may be configured to establish a mapping relationship between the second trigger instruction and the asynchronous mode to obtain the second configuration list.

It should be noted that the display screen display parameter adjustment device can be used to execute the display screen display parameter adjustment method provided in the embodiments and has the corresponding functional modules and beneficial effects for performing the method. For technical details that are not described in detail in the device embodiments, reference can be made to the corresponding method embodiments.

It should be noted that, in the embodiments of the present disclosure, the terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . " shall not obviate that in addition to containing the said essential element in the process, method, object or equipment, other essential element of the same nature may also exist in the above-mentioned process, method, object or equipment.

In the several embodiments provided by the present disclosure, it should be understood that the disclosed apparatus and method may be implemented in other manners. For example, the apparatus embodiments described above are merely illustrative. For example, the unit division is merely logical function division and there may be other division in actual implementation. For example, multiple units or components may be combined or integrated into another system, or some features can be omitted or not be executed. In addition, the mutual coupling or the direct coupling or the communication connection as shown or discussed may be indirect coupling or communication connection through some interfaces, devices or units, and may be in electrical, mechanical or other forms.

The units described as separate components may or may not be physically separated. The components displayed as units may or may not be physical units, that is, may be located in one place or may also be distributed to multiple network units. Some or all of the units may be selected according to actual needs to achieve the objectives of the solution in the disclosure.

In addition, each functional unit in each embodiment of the present disclosure may be integrated into one processing unit, or each unit may exist alone physically, or two or more units may be integrated in one unit. The above-mentioned integrated unit can be implemented in the form of hardware or in the form of hardware plus software functional unit.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer. The computer-readable storage medium may include various media that can store program codes, such as a removable storage medium, a read-only memory (ROM), a magnetic disk, an optical disk.

Alternatively, when the above integrated units of the present disclosure are implemented in software functional modules and sold or used as a standalone product, they can be stored in a computer readable storage medium. In view of this, the technical solutions according to the embodiments of the present disclosure, or in other words a part thereof which makes contribution over the prior art, can be substantially embodied in a form of software product. The computer software product can be stored in a storage medium, such as ROM/RAM, magnetic disk, optical disc and the like, containing instructions which cause a computer device (which can be a personal computer, a server, a network device or the like) to perform one or more methods according to the embodiments of the present disclosure or particular parts thereof. The storage medium may be any of various mediums capable of storing program codes, such as a mobile storage device, a ROM, a RAM, a magnetic disk or an optical disc.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display screen display parameter adjustment method comprising:
    obtaining a trigger event of display parameters of a display screen, the display screen including a first display area and a second display area;
    when the trigger event satisfies a preset condition, determining that an adjustment mode of the display parameters of the display screen is a synchronous mode and switching to the synchronous mode, and simultaneously adjusting the display parameters of the first display area and the second display area to have the same display parameters; and
    when the trigger event does not satisfy the preset condition, determining that the adjustment mode of the display parameters of the display screen is an asynchronous mode and switching to the asynchronous mode, and adjusting the display parameters of the first display area and the second display area, respectively, such that the display parameters of the first display area are different from the display parameters of the second display area, wherein the display parameters comprise of at least brightness, saturation, and sharpness.

2. The method of claim 1 further comprising:

detecting a plurality of displayed objects in the first display area and the second display area to obtain a detection result; and if the detection result indicates that the first display area and second display area are both displaying different parts of a same object, switching a current adjustment mode from the asynchronous mode to the synchronous mode, and simultaneously adjusting the display parameters of the first display area and the second display area.

3. The method of claim 1 further comprising:

detecting a working mode of the first display area;

if the detection result indicates that the working mode of the first display area is a first preset mode, switching the current adjustment mode from the synchronous mode to the asynchronous mode, and adjusting the display parameters of the second display area to a preset threshold; and if the detection result indicates that the first display area has exited the first preset mode, switching the current adjustment mode from the asynchronous mode to the synchronous mode, and simultaneously adjusting the display parameters of the first display area and the second display area.

4. The method of claim 3, wherein if the detection result indicates that the working mode of the first display area is the first preset mode, switching the current adjustment mode from the synchronous mode to the asynchronous mode includes:

if the detection result indicates that the working mode of the first display area is the first preset mode, detecting an operating time of the first preset mode; and if the detection result indicates that the operating time satisfies a preset threshold, switching the current adjustment mode from the synchronous mode to the asynchronous mode.

5. The method of claim 1, wherein obtaining the trigger event of the display parameters of the display screen includes:

obtaining a trigger operation for adjusting the display parameters of the display screen, and generating a parameter adjustment interface, the parameter adjustment interface including an adjustment mode option; and obtaining the trigger event based on a selection of the adjustment mode option.

6. The method of claim 1, wherein obtaining the trigger event of the display parameters of the display screen includes:

obtaining a trigger instruction for adjusting the display parameters of the display screen; and based on the trigger instruction, querying whether there is an adjustment mode corresponding to the trigger instruction from a user configuration list, and generating the trigger event based on the query result.

7. The method of claim 6, wherein:

the user configuration list includes a first configuration list and a second configuration list, the first configuration list being obtained by establishing a mapping relationship between a first trigger instruction and the synchronous mode, the second configuration list being obtained by establishing a mapping relationship between a second trigger instruction and the asynchronous mode.

8. A display screen display parameter adjustment device comprising:

an acquisition module configured to obtain a trigger event of display parameters of the display screen, the display screen including a first display area and a second display area;

a synchronous module configured to determine that an adjustment mode of the display parameters of the display screen is a synchronous mode and switching to the synchronous mode, and simultaneously adjust the display parameters of the first display area and the second display area to have the same display parameters when the trigger event satisfies a preset condition; and an asynchronous module configured to determine that the adjustment mode of the display parameters of the display screen is an asynchronous mode and switching to the asynchronous mode, and adjust the display parameters of the first display area and the second display area, respectively, such that the display parameters of the first display area are different from the display parameters of the second display area when the trigger event does not satisfy the preset condition, wherein the display parameters comprise of at least brightness, saturation, and sharpness.

9. The device of claim 8 further comprising:

a first detection module configured to detect a plurality of displayed objects in the first display area and the second display area to obtain a detection result; and a first switching module configured to switch a current adjustment mode from the asynchronous mode to the synchronous mode, and simultaneously adjusting the display parameters of the first display area and the second display area if the detection result indicates that the first display area and second display area are both displaying different parts of a same object.

10. The device of claim 8 further comprising:

a second detection module configured to detect a working mode of the first display area; and a second switching module configured to switch the current adjustment mode from the synchronous mode to the asynchronous mode, and adjust the display parameters of the second display area to a preset threshold if the detection result indicates that the working mode of the first display area is a first preset mode; and a third detection module configured to switch the current adjustment mode from the asynchronous mode to the synchronous mode, and simultaneously adjust the display parameters of the first display area and the second display area if the detection result indicates that the first display area has exited the first preset mode.

11. The device of claim 10, wherein the second switching module includes:

a detection unit configured to detect an operating time of the first preset mode if the detection result indicates that the working mode of the first display area is the first preset mode; and a switching unit configured to switch the current adjustment mode from the synchronous mode to the asynchronous mode if the detection result indicates that the operating time satisfies a preset threshold.

12. The device of claim 8, wherein the acquisition module includes:
an acquisition unit configured to obtain a trigger operation for adjusting the display parameters of the display screen to generate a parameter adjustment interface, the parameter adjustment interface including an adjustment mode option; and
a generating unit configured to generate the trigger event based on a selection of the adjustment mode option.

13. The device of claim 12, wherein:
the acquisition unit is further configured to obtain a trigger instruction for adjusting the display parameters of the display screen; and
the generating unit is further configured to, based on the trigger instruction, query whether there is an adjustment mode corresponding to the trigger instruction from a user configuration list, and generate the trigger event based on the query result, the user configuration list including a first configuration list and a second configuration list.

14. The device of claim 12 further comprising:
a first mapping unit configured to establish a mapping relationship between a first trigger instruction and the synchronous mode to obtain the first configuration list; and
a second mapping unit configured to establish a mapping relationship between a second trigger instruction and the asynchronous mode to obtain the second configuration list.

15. A non-transitory computer-readable storage medium containing computer-executable instructions for, when executed by one or more processors, performing a display screen display parameter adjustment method, the method comprising:
obtaining a trigger event of display parameters of a display screen, the display screen including a first display area and a second display area;
when the trigger event satisfies a preset condition, determining that an adjustment mode of the display parameters of the display screen is a synchronous mode and switching to the synchronous mode, and simultaneously adjusting the display parameters of the first display area and the second display area to have the same display parameters; and
when the trigger event does not satisfy the preset condition, determining that the adjustment mode of the display parameters of the display screen is an asynchronous mode and switching to the asynchronous mode, and adjust the display parameters of the first display area and the second display area, respectively, such that the display parameters of the first display area are different from the display parameters of the second display area,
wherein the display parameters comprise of at least brightness, saturation, and sharpness.

16. The non-transitory computer-readable storage medium according to claim 15, the method further comprising:
detecting a plurality of displayed objects in the first display area and the second display area to obtain a detection result; and
if the detection result indicates that the first display area and second display area are both displaying different parts of a same object, switching a current adjustment mode from the asynchronous mode to the synchronous mode, and simultaneously adjusting the display parameters of the first display area and the second display area.

17. The non-transitory computer-readable storage medium according to claim 15, the method further comprising:
detecting a working mode of the first display area;
if the detection result indicates that the working mode of the first display area is a first preset mode, switching the current adjustment mode from the synchronous mode to the asynchronous mode, and adjusting the display parameters of the second display area to a preset threshold; and
if the detection result indicates that the first display area has exited the first preset mode, switching the current adjustment mode from the asynchronous mode to the synchronous mode, and simultaneously adjusting the display parameters of the first display area and the second display area.

18. The non-transitory computer-readable storage medium of claim 17, wherein switching the current adjustment mode from the synchronous mode to the asynchronous mode if the detection result indicates that the working mode of the first display area is the first preset mode includes:
if the detection result indicates that the working mode of the first display area is the first preset mode, detecting an operating time of the first preset mode; and
if the detection result indicates that the operating time satisfies a preset threshold, switching the current adjustment mode from the synchronous mode to the asynchronous mode.

19. The non-transitory computer-readable storage medium of claim 15, wherein obtaining the trigger event of the display parameters of the display screen includes:
obtaining a trigger operation for adjusting the display parameters of the display screen, and generating a parameter adjustment interface, the parameter adjustment interface including an adjustment mode option; and
obtaining the trigger event based on a selection of the adjustment mode option.

20. The non-transitory computer-readable storage medium of claim 15, wherein obtaining the trigger event of the display parameters of the display screen includes:
obtaining a trigger instruction for adjusting the display parameters of the display screen; and
based on the trigger instruction, querying whether there is an adjustment mode corresponding to the trigger instruction from a user configuration list, and generating the trigger event based on the query result.

* * * * *